(12) United States Patent
Shen et al.

(10) Patent No.: US 11,263,454 B2
(45) Date of Patent: Mar. 1, 2022

(54) SYSTEM AND METHOD FOR VIDEO-BASED PIG COUNTING IN THE CROWD

(71) Applicants: JINGDONG DIGITS TECHNOLOGY HOLDING CO., LTD., Beijing (CN); JD FINANCE AMERICA CORPORATION, Wilmington, DE (US)

(72) Inventors: Shiwen Shen, Palo Alto, CA (US); Guang Chen, Mountain View, CA (US); Longyin Wen, Sunnyvale, CA (US); Si Luo, Bothell, WA (US); Liefeng Bo, Sunnyvale, CA (US)

(73) Assignees: JINGDONG DIGITS TECHNOLOGY HOLDING CO., LTD., Beijing (CN); JD FINANCE AMERICA CORPORATION, Wilmington, DE (US)

( * ) Notice: Subject to any disclaimer, the term of this patent is extended or adjusted under 35 U.S.C. 154(b) by 59 days.

(21) Appl. No.: 16/882,580

(22) Filed: May 25, 2020

(65) Prior Publication Data
US 2021/0365663 A1    Nov. 25, 2021

(51) Int. Cl.
*G06K 9/00*      (2006.01)
*G06T 7/11*      (2017.01)
(Continued)

(52) U.S. Cl.
CPC ....... *G06K 9/0063* (2013.01); *G06K 9/00362* (2013.01); *G06K 9/00664* (2013.01);
(Continued)

(58) Field of Classification Search
None
See application file for complete search history.

(56) References Cited

U.S. PATENT DOCUMENTS

| 10,943,114 B2* | 3/2021 | Dvir | G06K 9/4652 |
| 2004/0179736 A1* | 9/2004 | Yin | G06K 9/2018 |
| | | | 382/191 |

(Continued)

FOREIGN PATENT DOCUMENTS

WO    WO-2020072918 A1 *   4/2020    ........... G06K 9/6267

OTHER PUBLICATIONS

Mining Mid-level Features for Action Recognition Based on Effective Skeleton Representation. Wang et al. (Year: 2014).*

(Continued)

*Primary Examiner* — Delomia L Gilliard
(74) *Attorney, Agent, or Firm* — China Science Patent & Trademark US LLC; Shanyun Lu

(57) ABSTRACT

A method and a system for counting pigs in a pig house. The system includes a computing device and an imaging device. The computing device has a processor and a storage device storing computer executable code. The computer executable code is configured to: receive images captured from one end to the other end of the house; detect keypoints in the images using a neural network; identify pig skeletons by associating several related keypoints; track the skeletons in the images to obtain trajectories; divide each image into an activated zone and a deactivated zone; designate a spatial value of 0 for the skeletons in the activated zone and a spatial value of 1 for the skeletons in the deactivated zone; summating first order difference of the spatial values for each trajectory to obtain a trajectory count; and add the trajectory counts to obtain pig count.

20 Claims, 12 Drawing Sheets

(51) Int. Cl.
  *G06T 7/73*    (2017.01)
  *G06T 7/246*   (2017.01)
  *G06N 3/08*    (2006.01)
  *G06K 9/62*    (2022.01)
(52) U.S. Cl.
  CPC ............... *G06K 9/628* (2013.01); *G06N 3/08* (2013.01); *G06T 7/11* (2017.01); *G06T 7/246* (2017.01); *G06T 7/73* (2017.01); *G06T 2207/20084* (2013.01); *G06T 2207/30242* (2013.01)

(56) References Cited

U.S. PATENT DOCUMENTS

| | | | |
|---|---|---|---|
| 2007/0285419 A1* | 12/2007 | Givon | G06T 17/00 345/420 |
| 2009/0010490 A1* | 1/2009 | Wang | G06T 7/292 382/103 |
| 2014/0333769 A1* | 11/2014 | Shibuya | G07C 9/00 348/148 |
| 2018/0225517 A1* | 8/2018 | Holzer | G06K 9/22 |
| 2018/0279921 A1* | 10/2018 | Datta | A61B 5/1123 |
| 2019/0102613 A1* | 4/2019 | Watanabe | G06T 7/194 |
| 2020/0150696 A1* | 5/2020 | Womble | E01H 1/006 |
| 2020/0214266 A1* | 7/2020 | Fujiyama | A01K 29/005 |
| 2020/0279428 A1* | 9/2020 | Guay | G06T 13/40 |
| 2020/0410669 A1* | 12/2020 | Psota | G06K 9/00369 |
| 2021/0165910 A1* | 6/2021 | Huang | G06F 21/6254 |

OTHER PUBLICATIONS

Automated Pig Counting Using Deep Learning. Tian et al. (Year: 2019).*

Tian Mengxiao, Hao Guo, Hong Chen, et al., Automated pig counting using deep learning, Computers and Electronics in Agriculture, 2019, 163, 0168-1699.

Xu Liu, Steven W. Chen, Shreyas Aditya, et al., Robust fruit counting: combining deep learning, tracking, and structure from motion, 2018 IEEE/RSJ International Conference on Intelligent Robots and Systems (IROS), 2018, arXiv:1804.00307.

Xu Liu, Steven W Chen, Chenhao Liu, et al., Monocular camera based fruit counting and mapping with semantic data association, IEEE Robotics and Automation Letters, 2019, 4(3): 2296-2303.

Jarrod C Hodgson, Shane M Baylis, Rowan Mott, et al., Precision wildlife monitoring using unmanned aerial vehicles, Scientific reports, 2016, 6: 22574.

Rivas A, Chamoso P, Gonzalez-Briones A, Corchado JM, Detection of cattle using drones and convolutional neural networks, Sensors, 2018, 18(7): 2048.

Andrew G Howard, Menglong Zhu, Bo Chen, et al., Mobilenets: efficient convolutional neural networks for mobile vision applications, 2017, arXiv:1704.04861.

Vijay Badrinarayanan, Alex Kendall, Roberto Cipolla, SegNet: a deep convolutional encoder-decoder architecture for image segmentation, IEEE transactions on pattern analysis and machine intelligence, 2017, 39(12): 2481-95.

Wei Liu, Dragomir Anguelove, Dumitru Erhan, et al, SSD: single shot multibox detector, European conference on computer vision, 2016, 21-37, Springer, Cham, arXiv:1512.02325.

Joseph Redmon, Santosh Diwala, Ross Girshick, Ali Farhadi, You only look once: unified, real-time object detection, Proceedings of the IEEE conference on computer vision and pattern recognition, 2016, 779-788.

Ross Girshick, Fast R-CNN, Proceedings of the IEEE international conference on computer vision, 2015, 1440-1448.

* cited by examiner

SYSTEM AND METHOD FOR VIDEO-BASED PIG COUNTING IN THE CROWD

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification and/or listed in the reference part are incorporated herein by reference in their entirety and to the same extent as if each reference was individually incorporated by reference.

FIELD

The present disclosure relates generally to count a large group of animals, and more particularly to systems and methods of video-based counting of a herd of pigs in the crowd.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Pig group houses generally accommodate a large number of pigs, and frequently counting the number of pigs in the grouping houses is a critical management task for large-scale pig farming facilities. On one hand, pigs are often moved into different barns at distinct growth stages or grouped into separate large pens by size, and farmers need to know how many pigs are in each large pens. On the other hand, comparing the counting result with the actual number of pigs enables the early detection of unexpected events, e.g., missing pigs. However, walking around the pig barns to count a large number of pigs is costly in labor.

Therefore, an unaddressed need exists in the art to address the aforementioned deficiencies and inadequacies.

SUMMARY

In certain aspects, the present disclosure relates to a system for counting animals in a house. The system includes a computing device and an imaging device. The computing device includes a processor and a storage device storing computer executable code. The computer executable code, when executed at the processor, is configured to:

receive a plurality of images captured by the imaging device from one end of the house toward an opposite, other end of the house;

detect keypoints in each of the images using a neural network;

identify skeletons of the animals by associating a plurality of the keypoints in the images, each skeleton corresponds to one of the animals;

track the identified skeletons in the images to obtain trajectories of the skeletons;

divide each of the images into an activated zone and a deactivated zone;

designate first spatial values for the skeletons in the activated zone and second spatial values for the skeletons in the deactivated zone;

provide a trajectory count for each of the trajectories by summating first order difference of the first and second spatial values of corresponding one of the skeletons in corresponding one of the trajectories; and add the trajectory counts of the trajectories to obtain a count of the animals.

In certain embodiments, each of the skeletons includes at least one of five types of keypoints. The five types of keypoints include a head keypoint corresponding to head of the animal, a neck keypoint corresponding to neck of the animal, a back keypoint corresponding to back of the animal, a waist keypoint corresponding to waist of the animal, and a tail keypoint corresponding to tail of the animal. Each of the detected keypoints includes a classification indicating which of the five type of keypoints the detected keypoint belongs to and a vector indicating a direction toward at least one of the detected keypoints that belongs to a same skeleton as the detected keypoint. In certain embodiments, the back keypoint is defined as the root keypoint, the neck keypoints and the waist keypoints are labeled the same type, and the head keypoint and the tail keypoints are labeled the same type.

In certain embodiments, the first spatial value is 0 and the second spatial value is 1.

In certain embodiments, size of the activated zone and size of the deactivated zone are substantially equal, and the activated zone is in front of the deactivated zone along moving direction of the imaging device.

In certain embodiments, the computer executable code is further configured to: filter out skeletons close to an activity scanning line separating the activated zone and the deactivated zone.

In certain embodiments, the computer executable code is configured to track the identified skeletons in the images by bipartite graph matching.

In certain embodiments, the neural network is a convolutional neural network (CNN) and the animals are pigs.

In certain embodiments, the imaging device is installed on a guide rail above the house from the one end to the other end of the house. In certain embodiments, the neural network is trained in a remote computing device, and the computing device is movable with the imaging device and is an embedded device. In other words, the neural network may either be trained on the computing device of the pig counting system, or be trained on some other computers and then transferred to the computing device of the pig counting system.

In certain embodiments, the imaging device includes multiple cameras fixed on top of the house such that the field of view of the cameras cover the whole inner area of the house.

In certain embodiments, the computing device and the imaging device are installed on a drone.

In certain aspects, the present disclosure relates to a method for counting animals in a house. In certain embodiments, the method includes:

receiving, by a computing device, a plurality of images captured by an imaging device from one end of the house toward an opposite, other end of the house;

detecting, by the computing device, keypoints in each of the images using a neural network;

identifying, by the computing device, skeletons of the animals by associating a plurality of the keypoints in the images, each skeleton corresponds to one of the animals;

tracking, by the computing device, the identified skeletons in the images to obtain trajectories of the skeletons;

dividing, by the computing device, each of the images into an activated zone and a deactivated zone;

designating, by the computing device, first spatial values for the skeletons in the activated zone and second spatial values for the skeletons in the deactivated zone;

providing, by the computing device, a trajectory count for each of the trajectories by summating first order difference of the first and second spatial values of corresponding one of the skeletons in corresponding one of the trajectories; and adding, by the computing device, the trajectory counts of the trajectories to obtain a count of the animals.

In certain embodiments, each of the skeletons includes at least one of five types of keypoints, the five types of keypoints include a head keypoint corresponding to head of the animal, a neck keypoint corresponding to neck of the animal, a back keypoint corresponding to back of the animal, a waist keypoint corresponding to waist of the animal, and a tail keypoint corresponding to tail of the animal. In certain embodiments, each of the detected keypoints includes a classification indicating which of the five type of keypoints the detected keypoint belongs to and a vector indicating a direction toward at least one of the detected keypoints that belongs to a same skeleton as the detected keypoint.

In certain embodiments, the first spatial value is 0 and the second spatial value is 1.

In certain embodiments, size of the activated zone and size of the deactivated zone are substantially equal, and the activated zone is in front of the deactivated zone along moving direction of the imaging device.

In certain embodiments, the method further includes: filtering out, by the computing device, skeletons close to an activity scanning line separating the activated zone and the deactivated zone.

In certain embodiments, the step of tracking the identified skeletons in the images is performed by bipartite graph matching.

In certain embodiments, the neural network is a convolutional neural network (CNN), and the animals are pigs.

In certain embodiments, the imaging device is installed on a guide rail above the house from the one end to the other end of the house, the neural network is trained in a remote computing device, and the computing device is movable with the imaging device and is an embedded device.

In certain aspects, the present disclosure relates to a non-transitory computer readable medium storing computer executable code. The computer executable code, when executed at a processor of a computing device, is configured to perform the method described above.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

DETAILED DESCRIPTION

Figure 1:
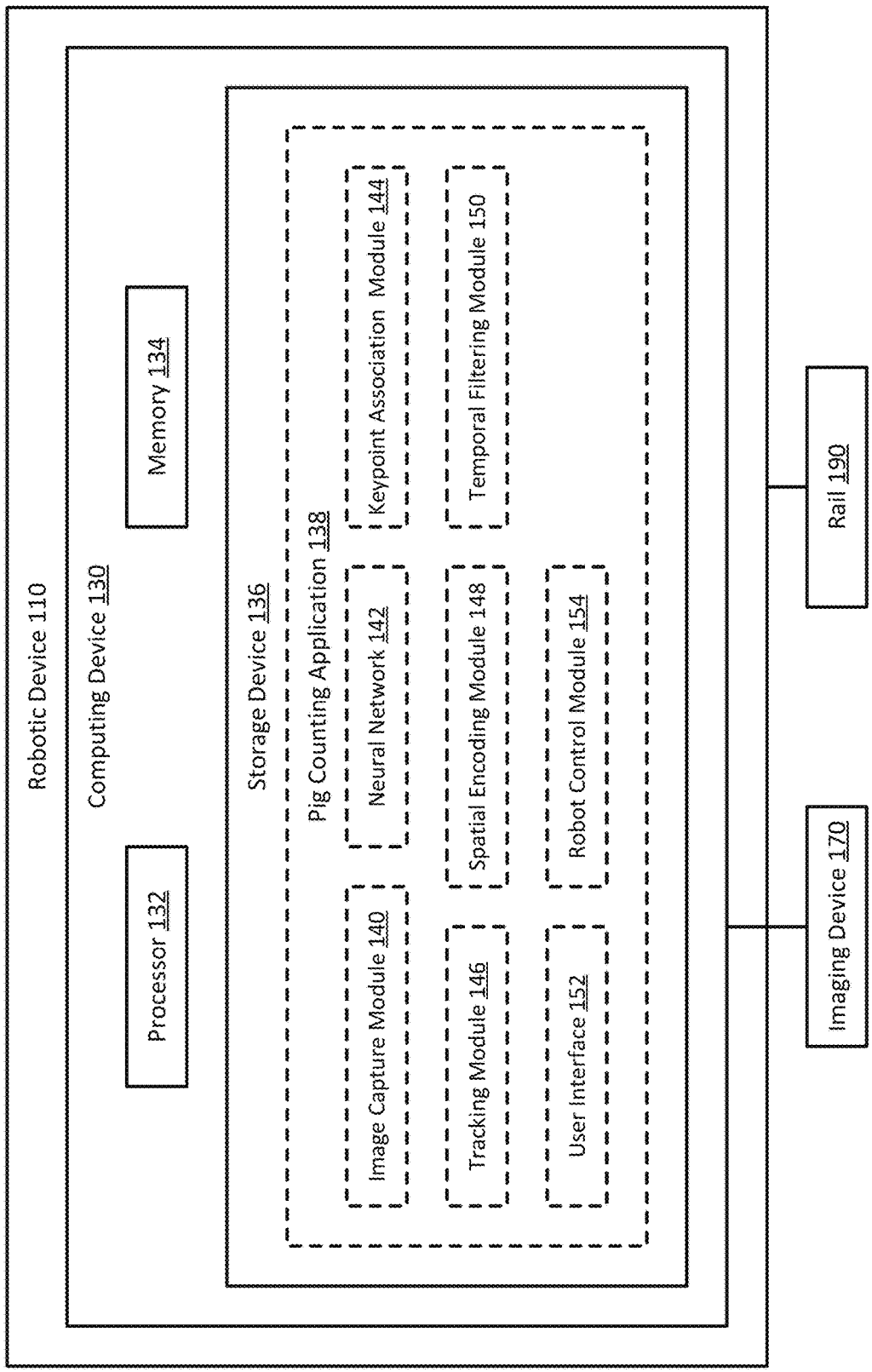
FIG. 1 schematically depicts a pig counting system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, "plurality" means two or more.

As used herein, the terms "comprising", "including", "carrying", "having", "containing", "involving", and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure. As used herein, the term "and/or" includes any and all combinations of one or more of the associated listed items.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

In certain aspects, the present disclosure relates to automated pig counting and monitoring using computer vision (CV) techniques, which is a promising way to support intensive pig farming management while reducing cost. In certain embodiments, the present disclosure has a field of view covering a large region, can deal with the cases that pigs frequently enter into or exit from the camera view, keeps detail individual information of the pigs, uses accurate location information of the pigs, associates targets across time, is suitable for flexible shaped and moving targets, and is suitable for indoor scenes with occlusion and overlapping.

FIG. 1 schematically depicts a pig counting system according to certain embodiments of the present disclosure. As shown in FIG. 1, the system 100 includes a robotic device 110, a computing device 130 installed with the robotic device 110, an imaging device 170 attached to the robotic device 110 and in communication with the computing device 130, and optionally a rail 190 for the robotic device 110 to move along. In certain embodiments, the computing device 130 may be a specialized computer with limited processing, memory and storage capacity, which reduces cost of the system 100 while still has sufficient power to implement the functions of the system 100. In certain embodiments, the computing device 130 may also be a server computer, a cluster, a cloud computer, or a general-purpose computer that are remote to the system 100, and in communication with the imaging device 170. In certain embodiments, the computing device 130 is an embedded device. In certain embodiments, the communication is performed via a network, which may be a wired or wireless network, and may be of various forms, such as a public network and a private network, or via non-transitory computer media including but not limited to flash drive, USB drives, hard drive, floppy disk, SD card, optical drive, or any other portable data storage media. In certain embodiments, the computing device 130 provides a user interface for configuring parameters of the robotic device 110, the computing device 130, and the imaging device 170, configuring or managing the communications between the devices 110, 130 and 170, and/or presents the counting result for a pig farm staff In certain embodiments, the robotic device 110, the computing device 130 and the imaging device 170 are integrally formed, and moves along the rail 190 together.

As shown in FIG. 1, the computing device 130 may include, without being limited to, a processor 132, a memory 134, and a storage device 136. In certain embodiments, the computing device 130 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 132 may be a central processing unit (CPU) which is configured to control operation of the computing device 130. The processor 132 can execute an operating system (OS) or other applications of the computing device 130. In some embodiments, the computing device 130 may have more than one CPU as the processor, such as two CPUs, four CPUs, eight CPUs, or any suitable number of CPUs. The memory 134 can be a volatile memory, such as the random-access memory (RAM), for storing the data and information during the operation of the computing device 130. In certain embodiments, the memory 134 may be a volatile memory array. In certain embodiments, the computing device 130 may run on more than one memory 134. The storage device 136 is a non-volatile data storage media for storing the OS (not shown) and other applications of the computing device 130. Examples of the storage device 136 may include non-volatile memory such as flash memory, memory cards, USB drives, hard drives, floppy disks, optical drives, solid-state drive (SSD) or any other types of data storage devices. In certain embodiments, the storage device 136 may be a local storage, a remote storage, or a cloud storage. In certain embodiments, the computing device 130 may have multiple storage devices 136, which may be identical storage devices or different types of storage devices, and the applications of the computing device 130 may be stored in one or more of the storage devices 136 of the computing device 130. In certain embodiments, the computing device 130 is a cloud computer, and the processor 132, the memory 134 and the storage device 136 are shared resources provided over the Internet on-demand. In certain embodiments, the computing device 130 is an embedded system that designed for pig counting, and may contain microprocessor with integrated memory and peripheral interfaces, or contain ordinary microprocessors.

As shown in FIG. 1, the storage device 136 includes a pig counting application 138. The pig counting application 138 is configured to provide pig counting service for pig farms which enables automatic pig counting based on video frames or video images. The pig counting application 138 includes an image capture module 140, a neural network 142, a keypoint association module 144, a tracking module 146, a spatial encoding module 148, a temporal filtering module 150, a user interface 152, and a robot control module 154. In certain embodiments, the pig counting application 138 may include other applications or modules necessary for the operation of the pig counting application 138. It should be noted that the modules are each implemented by computer executable codes or instructions, which collectively forms one application. In certain embodiments, each of the modules may further include sub-modules. Alternatively, some of the modules may be combined as one stack. In other embodiments, certain modules may be implemented as a circuit instead of executable code, and the computing device 130 may be implemented by a simple circuit board with other accessory components installed on the circuit board. In certain embodiments, some or all of the modules of the pig counting application 138 may be located at a remote computing device or distributed in a cloud.

Figure 2:
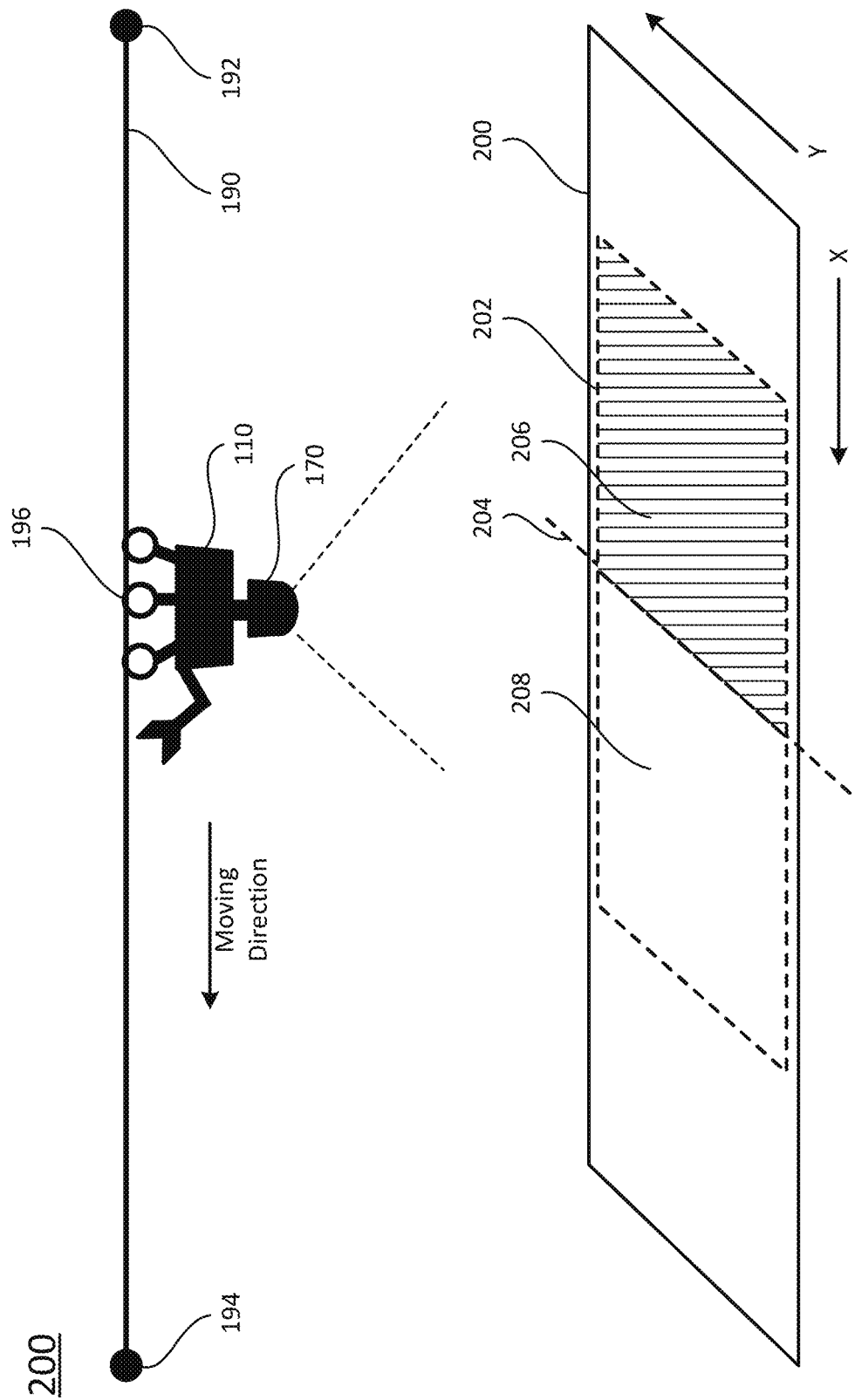
FIG. 2 schematically depicts a pig counting system installed in a pig house according to certain embodiments of the present disclosure.

The video capture module 140 is configured to, upon receiving an instruction or upon execution of the pig counting application 138, instruct the imaging device 170 to capture multiple sequential images or video frames of a pig house in a pig farm, and send the captured video frames to the neural network 142. FIG. 2 schematically shows a system 100 installed in a pig house 200. The pig house 200 may be barns or big pens for a group of pigs. The group of pigs may be farrowing pigs from birth to weaning, nursery pigs that are from weaning to about 6-8 weeks after weaning, or growing and finishing pigs that after nursery to full growth, which generally last 16 to 17 weeks. The pig house 200 may have wood, cement or stone floor, and the ceiling may allow certain sunshine or may be completely shaded. In certain embodiments, the pig house 200 in the present disclosure has a closed space, where the pigs cannot get out of the pig house 200 freely. As shown in FIG. 2, the rail 190 may be installed on the ceiling of the pig house 200, and have a first end 192 and a second end 194. The robotic device 110 is movable back and forth along the guide rail 190. The imaging device 170 is attached under the robotic device 110. When the robotic device 110 is located at a location 196, the imaging device 170 has a field of view 202 as shown by a dotted rectangular. Kindly note the length direction or "X" direction of the field of view 202 is part of the length of the pig house 200, and the width direction or "Y" direction of the field of view 202 is substantially the same as the width of the pig house 200. By this type of design, the field of view 202 of the imaging device 170 will cover the width direction of the house completely. An activity scanning line 204 separates the field of view 202 into two zones, an deactivated zone 206 in the rear side of the moving direction of the robotic device 110, and an activated zone 208 in the front side of the moving direction of the robotic device 110. In certain embodiments, the activity scanning line 204 is substantially directly under the imaging device 170. In certain embodiments, the images captured by the imaging device 170 may be red green blue (RGB) images or black and white images.

Figure 3:
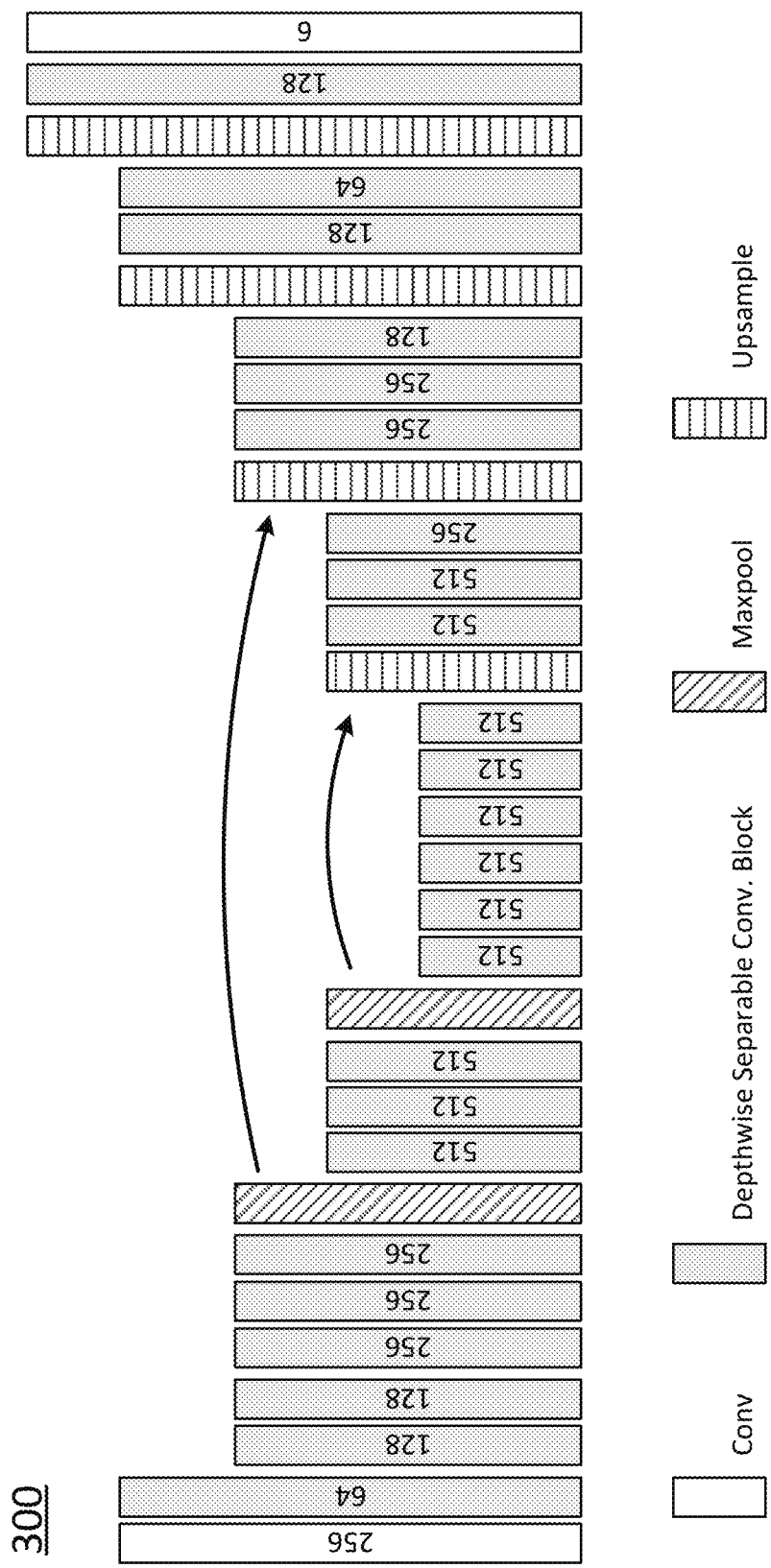
FIG. 3 schematically depicts a fully convolutional neural network according to certain embodiments of the present disclosure.

The neural network 142 is configured to, upon receiving the captured images from the image capture module 140, perform neural network operation on the images to detect keypoints from the images, and send the detected keypoints to the keypoint association module 144. In certain embodiments, the neural network 142 is a bottom-up detection convolutional neural network (CNN). FIG. 3 schematically depicts a fully convolutional network 300 used to detect visible keypoints in the images belong to each single pig. As shown in FIG. 3, the CNN 300 includes convolutional layers, convolutional blocks, maxpool layers and upsample layers. The depthwise separable convolutions are used as the basic building blocks to reduce the computational cost. Location-withheld max pooling is used to improve the localization accuracy, which preserves indices at the max pooling layers of the encoder and passed them to the corresponding up-sampling layers of the decoder.

In order to train the neural network 300, training data are provided. In certain embodiments, the training data includes a number of images of pigs in one or more pig houses. Detection of rigid objects in images are generally reliable. However, pigs often move in the pig house and have flexible bodies, and it is hard to accurately detect and differentiate the pigs. To solve this problem, in certain embodiments, the present disclosure uses associated keypoints to represent the pigs instead of defining bounding boxes and extract feature from the bounding boxes. In certain embodiments, the present disclosure uses five specific keypoints to identify each pig, and the five keypoints correspond to head, neck, back, waist, and tail of the pig. In certain embodiments, head and tail are labeled the same category for training the neural network 300, and neck and waits are labeled the same category for training the neural network 300. To further improve the detection accuracy, certain embodiments of the present disclosure also include the associations between the keypoints. For example, for the five keypoints of a pig, the distances and relative angles between neighboring keypoints are also recorded. The distance between the keypoints, especially the neighboring keypoints, may be measured using the image. The directions between the keypoints, especially the neighboring keypoints, may be represented by a vector from one keypoint toward another keypoint. Using the labels of the location and the direction of the five keypoints for the pigs in the images, the neural network 142 can be efficiently trained to extrapolate relations between neighboring keypoints.

Figure 4:
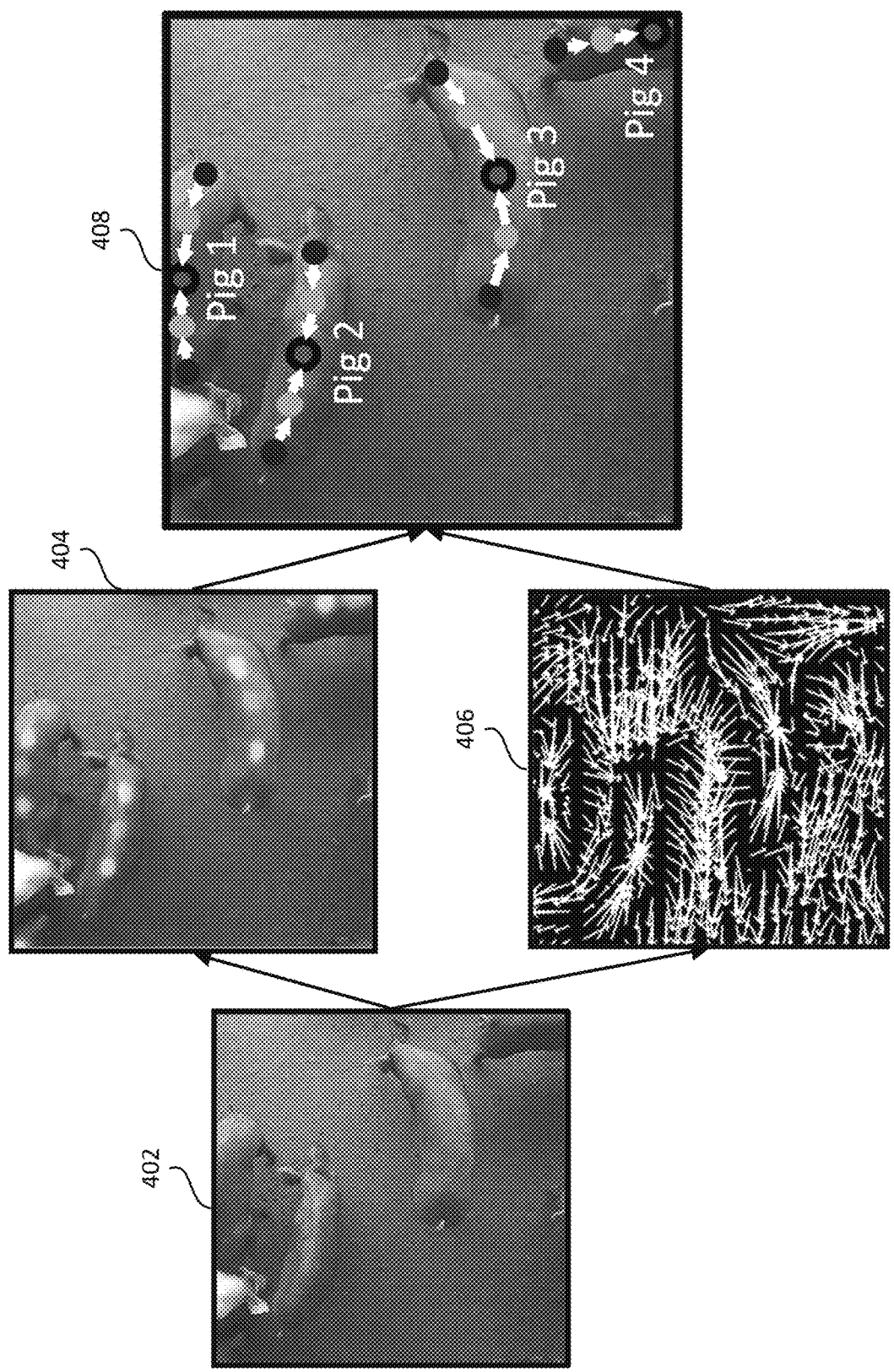
FIG. 4 schematically shows skeletons of pigs derived from keypoint heatmap and vector map according to certain embodiments of the present disclosure.

The well-trained neural network 142 can then be used for predicting keypoints of pigs in each of the captured images. FIG. 4 schematically shows predication of keypoints and association of keypoints to obtain skeletons. As shown in FIG. 4, when a captured frame 402 is used as input of the neural network 142, the neural network 142 is configured to generate a keypoint heatmap 404 and a vector map 406 from the captured frame 402. As shown in 404, each pig is labeled with five keypoints. By defining different part of the pig by different keypoints, the present disclosure can be used to differentiate one pig from the other pigs easily. For example, if two head keypoints and two neck keypoints are close to each other, the two head keypoints are unlikely to belong to a same pig, and the two neck keypoints are unlikely to belong to a same pig. Further, a head-neck pair may further be determined based on the distance and vector direction of the keypoints, and optionally based on the back, waist, and tail keypoints in proximate area. Specifically, a vector map 406 may be used to determine relationships between neighboring keypoints. In certain embodiments, the heatmap may include six channels, five channels for each keypoint type and one for background. In certain embodiments, head and tail are defined as the same type, and the neck and waist are defined as the same type, so that the five types can be reduced to three types: head/tail keypoint, neck/waist keypoint, and the back keypoint. Accordingly, four channels are presented in the heatmap, three channels for each keypoint type and one for background. The heatmap prediction is then formulated as a per-pixel multi-classification problem, and each pixel is learned by the neural network 142 as belonging to one of the keypoint types or the background.

The keypoint association module 144 is configured to, upon receiving the heatmap and the vector map of the keypoints from the neural network 142, associate keypoints for each of the pigs in the images to form a skeleton, and send the skeletons to the tracking module 146. As shown in FIG. 4, skeletons 408 of the pigs 1, 2, 3 and 4 are derived from the keypoint heatmap 404 and the vector map 406. In certain embodiments, when the distance and vector direction between the keypoints are used, the keypoints belong to the same pig are associated. As a result, each pig is represented by five associated keypoints. In certain embodiments, part of a pig in the image may be blocked, and there may be less than five associated keypoints for the pig.

In certain embodiments, due to instance-agnostic nature of the predicted keypoints on heatmaps, one unique instance ID has to be assigned for each detected keypoint so that the disclosure can "connect the dots" belonging to the same individual instance. For this purpose, the disclosure adds to the neural network a separate two channel outputs of offset field indicating the displacement from a given keypoint to its parent in the skeleton. At testing stage, an iterative greedy algorithm is adopted to associate the predicted keypoints. The disclosure alternatively searches the best candidate parent node for all the predicted keypoints, and removes the surplus keypoints from their candidate children list, until no better hypothesis could be found. The best candidate parent node is defined as the keypoint which is in the correct class and match the predicted offset vector best. The Euclidean distance between the predicted offset and the actual offset is used to measure the match. In certain embodiments, the mid-point or the back point of a pig is defined as the root keypoint, and the back keypoint is the parent of the corresponding neck keypoint and waist keypoint. Subsequently, the neck keypoint is the parent of the head keypoint, and the waist keypoint is the parent of the tail keypoint. The five keypoints of the pig, together with the parent/child relationship, defines the skeleton of the pig.

Figure 5:
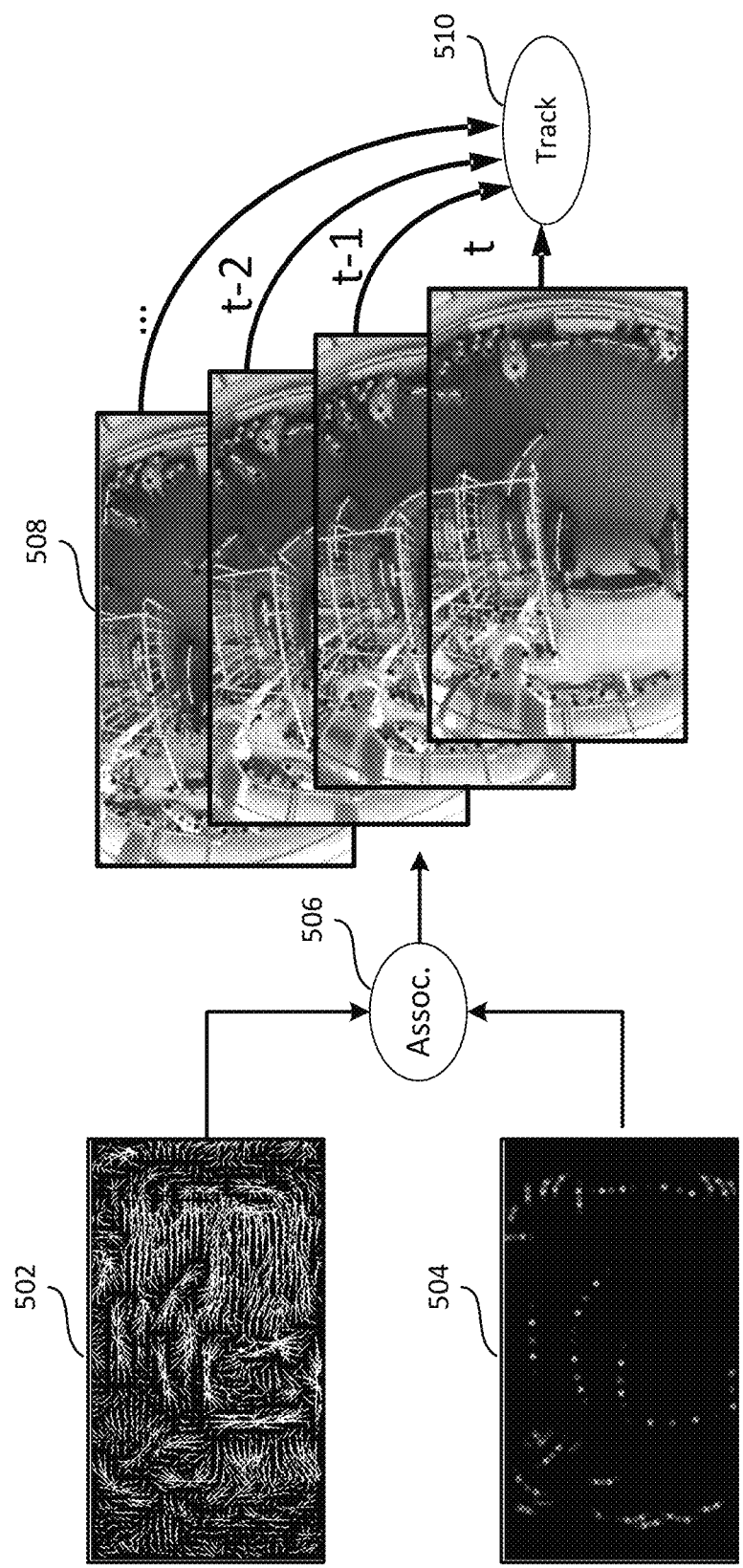
FIG. 5 schematically shows skeleton tracking according to certain embodiments of the present disclosure.

The tracking module 146 is configured to, upon receiving the skeletons for the pigs in the sequential images, track the skeletons in the sequential images, and send the tracked skeletons to the spatial encoding module 148. In certain embodiments, an efficient on-line tracking method is employed to associate pig keypoints temporally. The method takes the grouped pig keypoints (skeletons) for single frames as input, and then assigns a unique identification number (ID) to each pig across the frames. In certain embodiments, this problem is formulated as a bipartite graph matching based energy maximization problem. The estimated pig candidates C_t at frame t are then associated with the previous pig candidates C_(t-1) at frame t-1 by bipartite graph matching. In certain embodiments, this bipartite graph matching problem is solved using Hungarian method. FIG. 5 schematically shows the process of skeleton tracking. As shown in FIG. 5, skeletons in each of the frames t, t-1, t-2, . . . , are derived from the corresponding vector map 502 and the heatmap 504 by association 506. Each image includes detected keypoints, and the keypoints belong to the same group is assigned with a specific skeleton ID. The skeletons for the same pig in the multiple images 508 are then tracked to obtain a trajectory for each tracked pig.

Figure 6B:
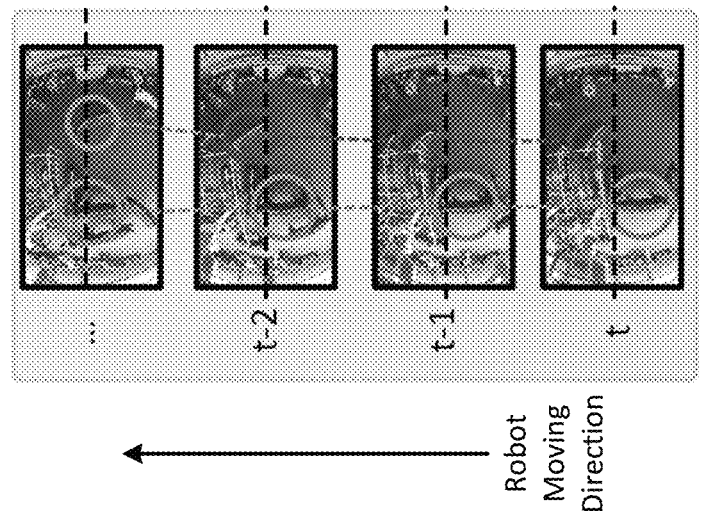
FIG. 6B schematically depicts spatial codes of two pig skeletons in a series of video images according to certain embodiments of the present disclosure.
Figure 6A:
FIG. 6A schematically shows a field of view of a video image according to certain embodiments of the present disclosure.

The spatial encoding module 148 is configured to, upon receiving the tracked images, designate a spatial code for each pig in each of the images, and send the spatial code to the temporal filtering module 150. FIG. 6A schematically depicts a field of view of one of the images, and FIG. 6B schematically depicts the spatial codes of two pigs in a series of images. As shown in FIG. 6A, for each image, the spatial encoding module 148 uses an activity scanning line 602 to divide the image into an activated zone 604 and a deactivated zone 606. In certain embodiments, the activity scanning line 602 is substantially perpendicular to the moving direction of the robotic device 110, and the activity scanning line 602 is roughly located in the center of the field of view and perpendicular to the moving direction, so that the sizes of the activated zone 604 and the deactivated zone 606 are the same or similar to each other. The activity scanning line 602 is stationary in a single image, but serves to scan the whole pig house moving with the robotic device 110. In other words, the activity line 602 moves in the different images. When a skeleton of a pig is located in the activated zone 604 in an image, the skeleton is designated with a corresponding code value, for example code value 0. When a skeleton of a pig is located in the deactivated zone 606 in an image, the skeleton is designated with a corresponding code value, for example code value 1. The deactivated zone 606 indicates that all candidate pigs in the deactivated zone 606 have already been counted by the pig counting application 138, and the candidate pigs in the activated zone 604 will be counted when the activity scanning line 602 scans through them. As shown in FIG. 6B, two of the tracked pigs are shown in the temporal images. The pig in the left side is located in the deactivated zone at the temporal images, the pig in the right side is located in the deactivated zone in the top image, and is located in the activated zone in the bottom three images. Since the robotic device 110 moves during capture of the images, the deactivated zone and the activated zone are dynamic in the images.

Figure 7A:
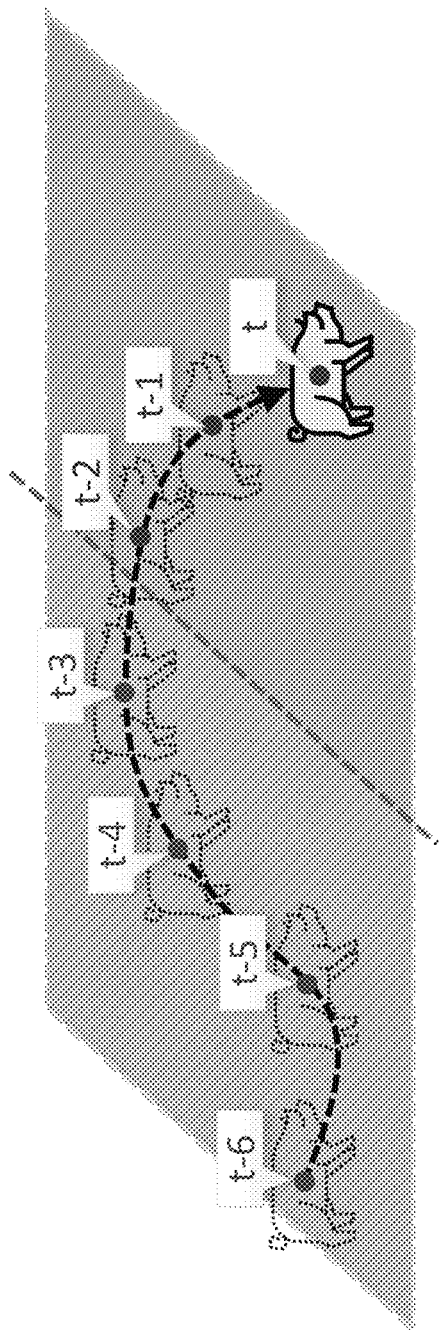
FIGS. 7A-7G schematically depict spatial codes of pigs being tracked according to certain embodiments of the present disclosure.
Figure 7B:
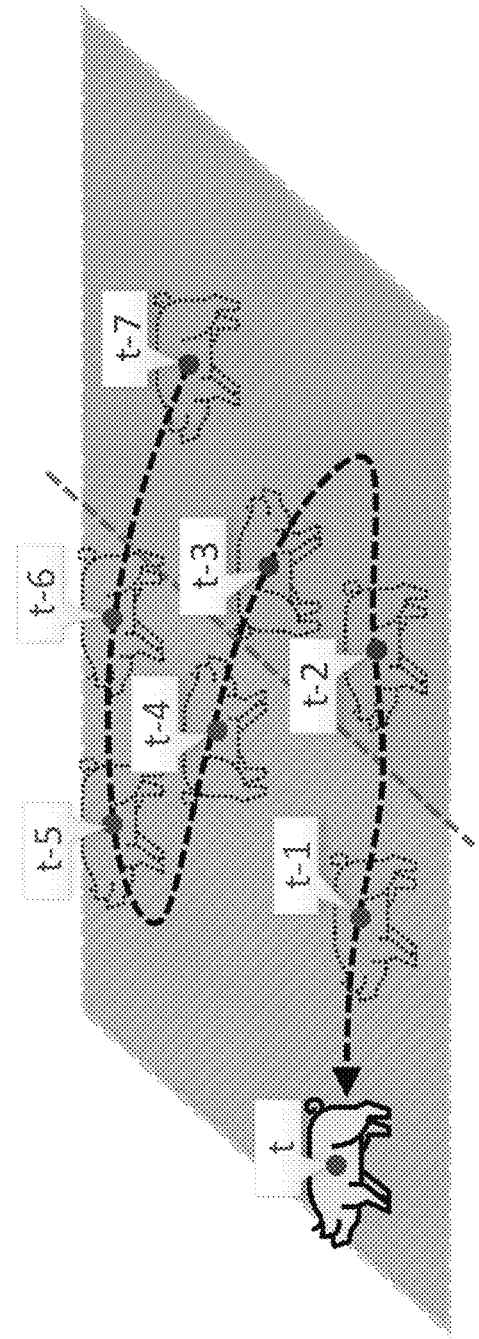
Figure 7D:
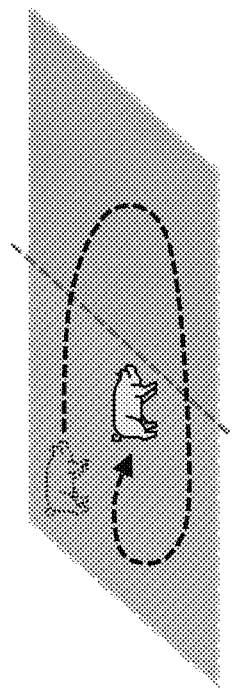
Figure 7F:
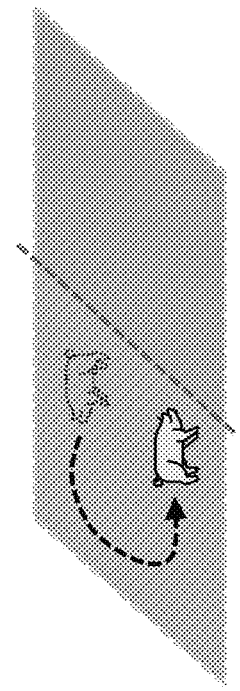
Figure 7H:
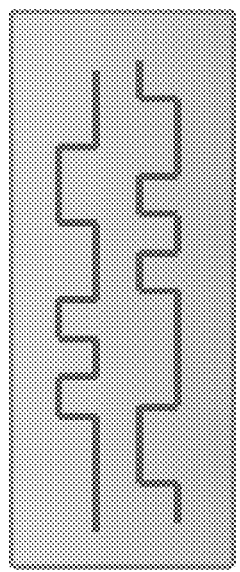
FIG. 7H schematically depicts summation of two series of temporal codes according to certain embodiments of the present disclosure.
Figure 7C:
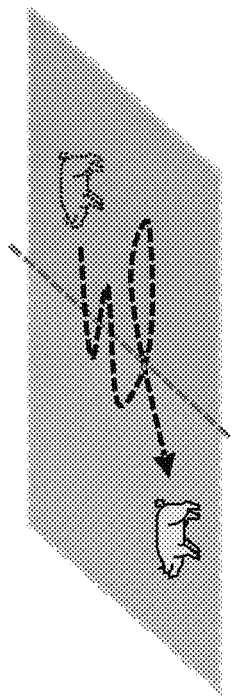
Figure 7E:
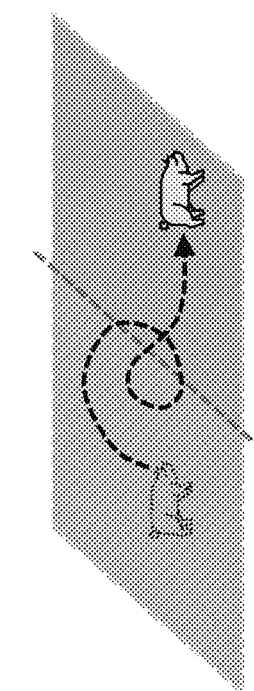
Figure 7G:
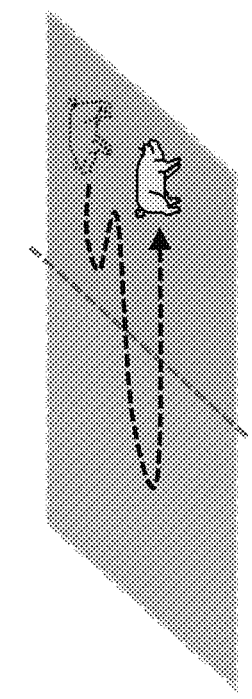

The temporal filtering module 150 is configured to, upon receiving the spatial encoding of the pig skeletons in the images, filter the temporal skeletons to count the pigs, and send the count to the user interface 152. In certain embodiments, upon receiving spatial encoding of the pigs in the images, the temporal filtering module 150 is configured to combine spatial code values of the same pig in the sequential images to generates a list of spatial codes. One pig or one trajectory of the pig has a list of spatial codes, each spatial code corresponds to status of the pig in a time point. FIG. 7A schematically shows code values of a pig in the time points $t-6$, $t-5$, $t-4$, $t-3$, $t-2$, $t-1$, and $t$. The code values are 0 for the time points $t-6$, $t-5$, $t-4$ and $t-3$ where the pig is located in the activated zone, and the code values are 1 for the time point $t-2$, $t-1$ and $t$ where the pig is located in the deactivated zone. Each of the first order differences between $t-6$ and $t-5$, between $t-5$ and $t-4$, between $t-4$ and $t-3$, between $t-2$ and $t-1$, and between $t-1$ and $t$, is 0, and the first order difference between $t-3$ and $t-2$ is 1. Thus, the generated list of temporal code values of the pig is [0, 0, 0, 0, 1, 1, 1] from $t-6$ to $t$, and the first order differences are [0, 0, 0, 1, 0, 0]. The temporal filtering module 150 defines the final count for this trajectory as the sum of the first order difference of the temporal codes. As a result, the final count for this pig is 1, which indicates that this pig is scanned once when it moves from the activated zone into the deactivated zone. Accordingly, the total count of pigs should be added by 1 due to the code values of the pig shown in FIG. 7A. Similarly, FIG. 7B shows a pig trajectory with code [1, 0, 0, 0, 1, 1, 0, 0], and sum of the first order difference inferred that the count was −1. This meant that this pig, which has been counted before, moved from scanned zone (deactivated zone) to to-be scanned zone (activated zone). Thus, the total count should minus 1. This design enabled the algorithm to avoid false positives counting caused by pig movements into/out camera view and from one zone to the other. FIGS. 7C-G show examples when the pig trajectory count was −1, 0, 1, 0, and 0, respectively. FIG. 7F represents a pig trajectory that never passes across the activity scanning line 702. FIG. 7D and FIG. 7G represent cases where the trajectories start and end in the same activated zone or deactivated zone. FIG. 7H schematically shows summation of two series of temporal codes, where the first order differences of the series temporal codes will result counts. These examples demonstrated that certain methods of the present disclosure would not be influenced by the tracking failures (e.g. breaks one trajectory into several trajectories caused by occlusion) that happened only in one single zone. In certain embodiments, a low-pass filter with window size of 5 is applied before the first order differential calculation. This low-pass filtering step is designed to avoid the trajectory jitter near the activity scanning line. The final counting result for the whole sequential images or video also adds the number of detected candidate objects in the deactivated zone of the beginning image and the number of detected candidates in activated zone of the ending image. In certain embodiments, when the imaging device 170 captures images at the end of a scanning process, the pigs in the activated zone are counted directly based on the number of skeletons in the activated zone, not counted using the temporal codes. In other words, the total number of pigs in the video is the same of the first order difference of the temporal code and the number of skeletons in the activation zone in the last frame. In an alternative embodiment, when the imaging device 170 captures images at the end of a scanning process, the final image of the video may be all defined as deactivated zone so as to count all the pigs in the image. After moving of the robotic device 110 from one end of the pig house 200 to the other end of the pig house 200, the who pig house area is scanned, and the total count correspond to the total number of pigs in the pig house 200.

The user interface 152 is configured to, upon receiving the count of the pigs in the temporal images, send the count or display the count to the user. In certain embodiments, the user interface 152 may include a screen to show the count. In certain embodiments, the user interface 152 may send the count to the user through a wireless or a wired network, or to a cloud server that the user can access. In certain embodiments, the user interface 152 may also provide a user interface to define image capturing parameters of the imaging device 170, operating parameters of the robotic device 110, and processing parameters of the pig counting application 138.

The robot control module 154 is configured to control the movement of the robotic device 110. In certain embodiments, the movement of the robotic device 110 and the image capturing of the imaging device 170 are coordinated by the pig counting application 138, and the movement of the robotic device 110 from one end to the other end of the rail 190 is accompanied with capturing of images by the imaging device 170.

The imaging device 170 is configured to capture video images of the pig house 200 and send the captured video images to the pig counting application 138. In certain embodiments, the imaging device 170 may be an RGB camera or a gray scale camera. In certain embodiments, the imaging device 170 may also be an RGBD camera having the capacity to perform depth detection.

The rail 190 is installed on the ceiling or a frame in the top space of the pig house 200. The robotic device 110 can be installed on the rail 190 and guided to move along the rail 190. In certain embodiments, the robotic device 110 includes a motor to move itself along the rail 190. In other embodiments, the motor may also be installed with the rail 190, and the robotic device 110 may passively move along the rail 190.

In certain embodiments, the system 100 may further include other components when needed. For example, when the neural network 142 is trained on site, the storage device 136 may further include a database for training the neural network 142; when local display is needed, the system 100 may further includes a display device connected to the user interface 152 to display pig counting result. In certain embodiments, not all the components shown in FIG. 1 are necessary for pig counting. For example, the pig counting application 138 may not include the user interface 152, and the counting result may be directly shown to a display after pig counting by the temporal filtering module 150, or the counting result is communicated to a remote device so that the counting result is accessible to a user through the remote device.

Figure 8A:
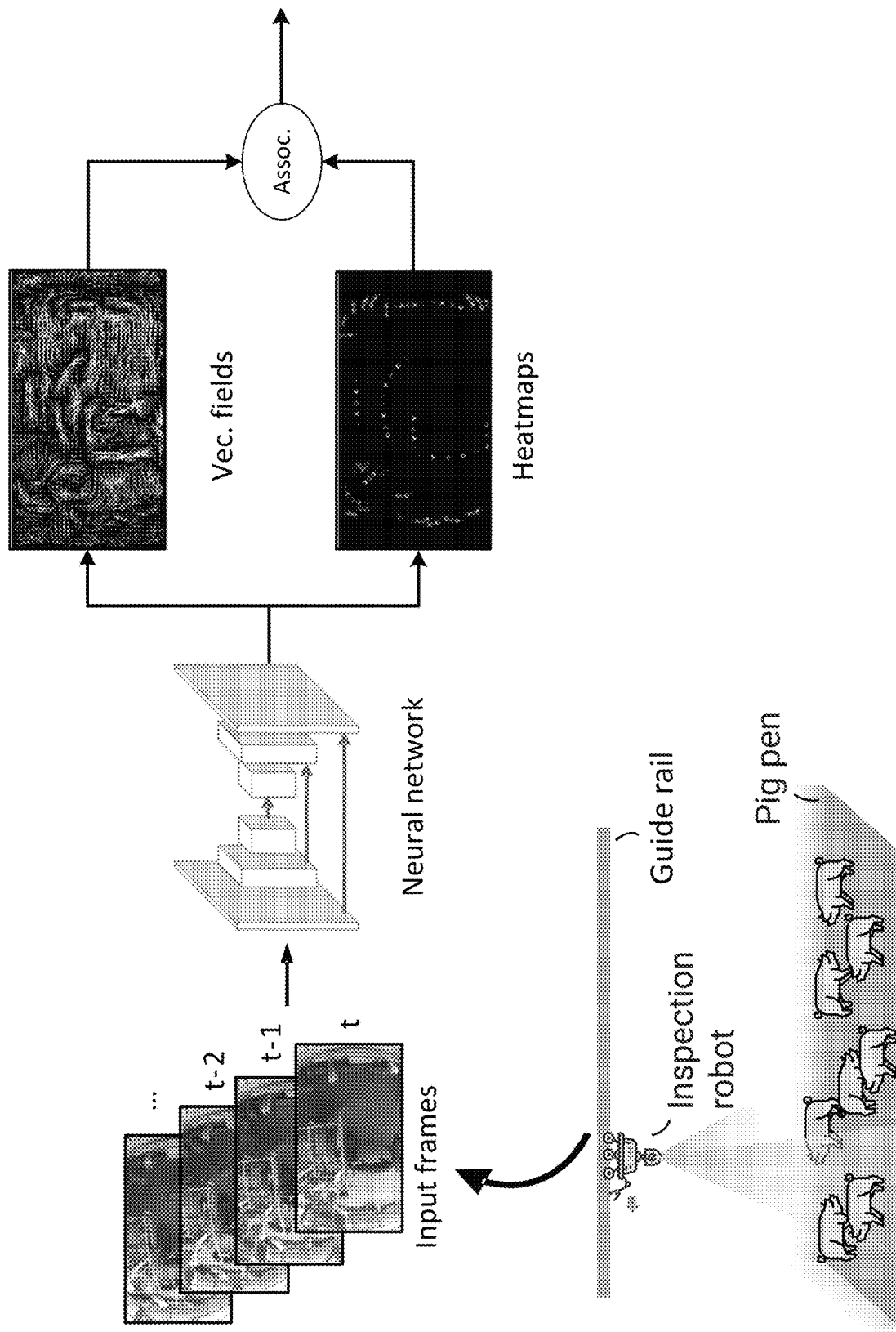
FIGS. 8A and 8B schematically depicts a process for pig counting according to certain embodiments of the present disclosure.
Figure 8B:
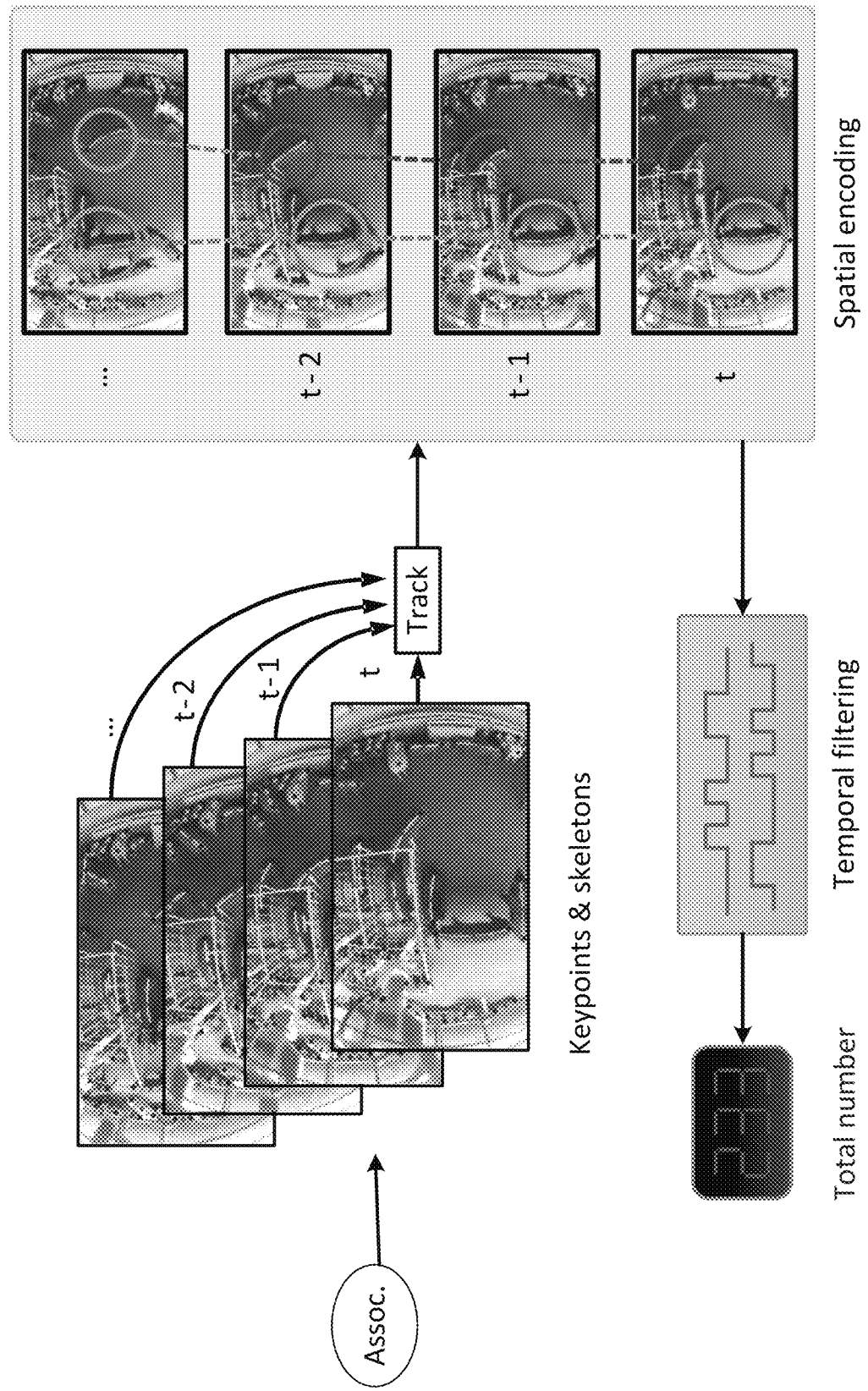

FIGS. 8A and 8B schematically depicts a process for pig counting according to certain embodiments of the present disclosure. As shown in FIGS. 8A and 8B, an inspection robot is movable on a guide rail above a pig pen. A camera of the inspection robot captures a video, and the frames t, t−1, t−2, . . . , of the video are used as input of a neural network. The neural network generates a vector field and a heatmap for each inputted frames, and the vector field and heatmap of each frame is associated to obtain skeletons for each pig in the frame. The skeletons of the pigs in the series of frames are tracked, and each of the skeletons corresponds to a tracked trajectory. For each trajectory, the skeletons in each frame is encoded a value based on whether the skeleton is located in the activated zone or deactivated zone. The spatial encodes are recorded and filtered, and a count of 0 or 1 is derived for each trajectory. The sum of the counts is the total number of the pigs in the pig pen.

Figure 9:
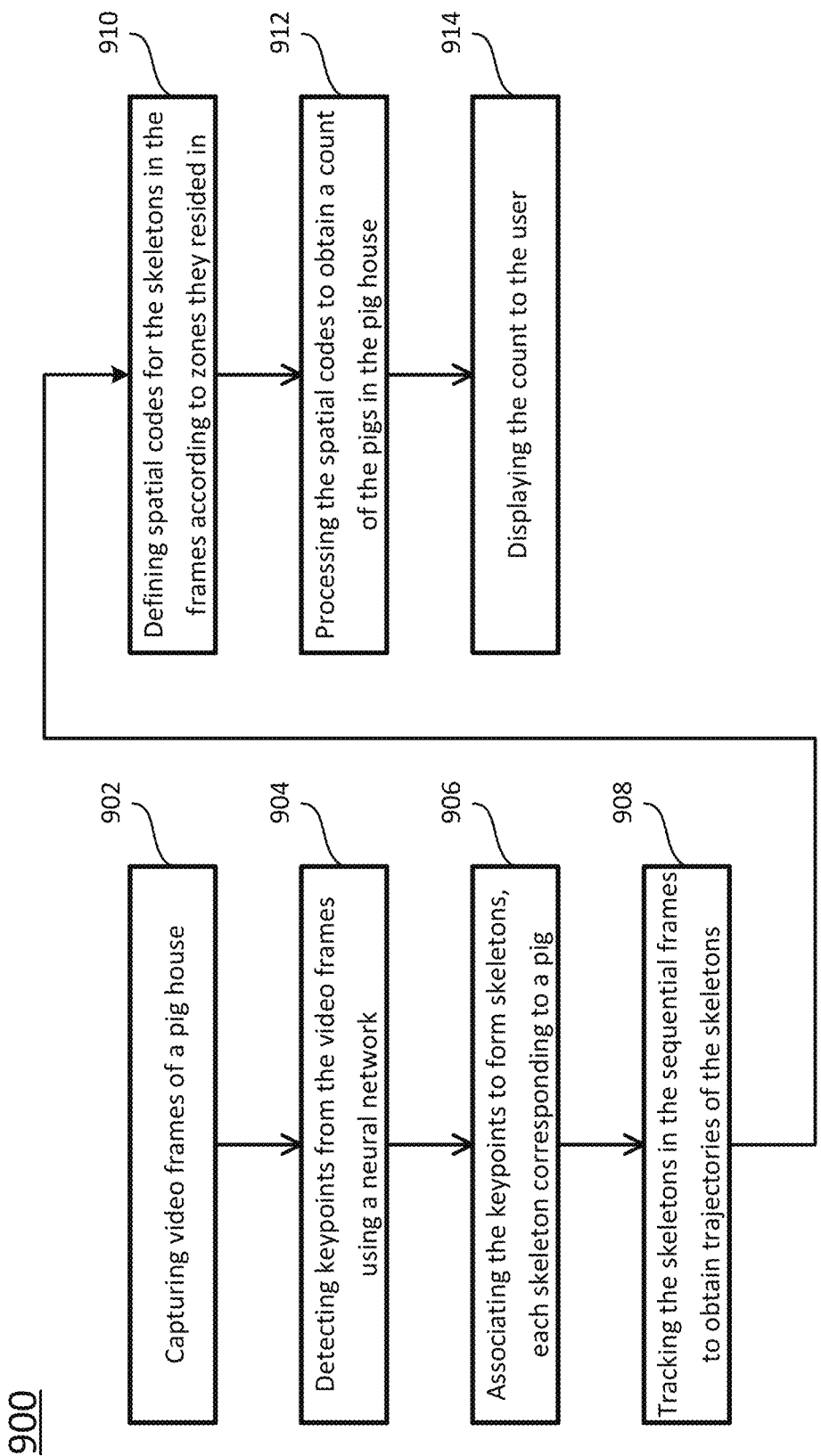
FIG. 9 schematically depicts a method for pig counting according to certain embodiments of the present disclosure.

FIG. 9 schematically depicts a method for pig counting according to certain embodiments of the present disclosure. In certain embodiments, the method is implemented by the robotic device 110 shown in FIG. 1. In certain embodiments, the method 900 shown in FIG. 9 corresponds to the function of the pig counting application 138. It should be particularly noted that, unless otherwise stated in the present disclosure, the steps of the method may be arranged in a different sequential order, and are thus not limited to the sequential order as shown in FIG. 9.

As shown in FIG. 9, at procedure 902, when the pig counting application 138 starts, the robotic device 110 moves along the rail 190 from one end toward the other end, the video capture module 140 instructs the imaging device 170 to capture images of the pig house 200, and sends the captured images to the neural network 142.

At procedure 904, upon receiving the captured images, the neural network 142 processes each of the images to detect keypoints, and sends the detected keypoints to the keypoint association module 144. In certain embodiments, for each detected keypoint in each of the frames, the detected features of the keypoints include not only the locations of each keypoint, but also the vector direction of the keypoints.

At procedure 906, upon receiving the detected keypoints, the keypoint association module 144 groups related keypoints in each of the images into skeletons, and sends the skeletons to the tracking module 146. Each skeleton corresponds to a pig in the frames. In certain embodiments, the skeleton is determined based on the distance and vector directions between the keypoints. In certain embodiments, each skeleton may include five keypoints corresponding to head, neck, back, waist, and tail of a pig.

At procedure 908, upon receiving the skeletons in the frames, the tracking module 146 tracks the skeletons in the images to form trajectories of the skeletons, and sends the trajectories to the spatial encoding module 148. Specifically, the tracking module 146 designate a tracking ID or a skeleton ID for each of the skeletons in a frame, and tracks the moving of the skeletons in multiple sequential frames. In certain embodiments, the skeletons in the sequential images are determined to have the same tracking ID or skeleton ID based on their location, the keypoints distribution in the skeleton, and the vector directions of the keypoints in the skeleton.

At procedure 910, upon receiving the trajectories of the skeletons in the sequential frames, the spatial encoding module 148 provides a spatial code for each of the skeletons in each of the frames, and sends the spatial code to the temporal filtering module 150. Specifically, for each of the frame, the spatial encoding module 148 divide the field of view to the activated zone and the deactivated zone. The frames cover the whole width of the pig house. The activated zone is in the front along the moving direction of the robotic device, the pigs in the activated zone are to be counted, and is assigned with a spatial code value of 0. The deactivated zone is in the back of the activated zone, the pigs in the deactivated zone have been counted, and is assigned with a spatial code value of 1.

At procedure 912, upon receiving the spatial codes of the skeletons in the frames, the temporal filtering module 150 processes the spatial values to obtain a count for the pigs in the pig house, and sends the count to the user interface 152. Each skeleton trajectory corresponds to a list of spatial codes corresponds to one or more sequential frames having the skeleton, the count for the trajectory is obtained as the sum of the first order difference of the spatial codes, and a summation of the count for all the trajectories is the final count of the pigs. In certain embodiments, a pig may be missing from some of the images, and may have a broken trajectory. The broken trajectory may include several trajectories determined by the pig counting application 138. In other words, the same pig may correspond to several trajectories, and the pig counting application 138 of the disclosure cannot discern that the several trajectories belong to the same pig. By the above spatial codes designation and count calculation, although the several trajectories may be recognized as corresponding to different pigs by the application, the summary of the counts of the several trajectories would still match the count of the pig, either being 0 or 1.

At procedure 914, upon receiving the final count of the pigs in the pig house 200, the user interface 152 displays the count for being viewed by the users, or communicates the count to another device that is accessible to the user.

In certain embodiments, the method described above cannot only count pigs in a pig house, but also count other animals in an encloses space.

In another aspect, the present disclosure relates to a non-transitory computer readable medium storing computer executable code. The code, when executed at a processor of a computing device, may perform the methods as described above. In certain embodiments, the non-transitory computer readable medium may include, but not limited to, any physical or virtual storage media. In certain embodiments, the non-transitory computer readable medium may be implemented as the storage device 136 of the computing device 130 as shown in FIG. 1.

Figure 10A:
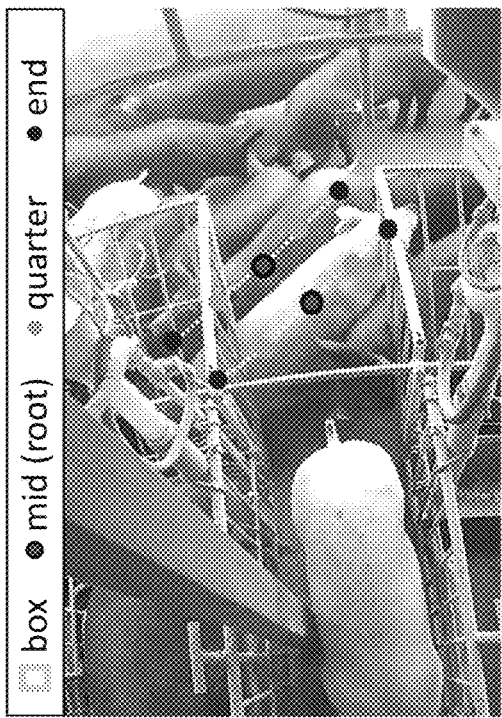
FIG. 10A and FIG. 10C schematically show a method of top-down detection of pigs according to certain embodiments of the present disclosure.
Figure 10B:
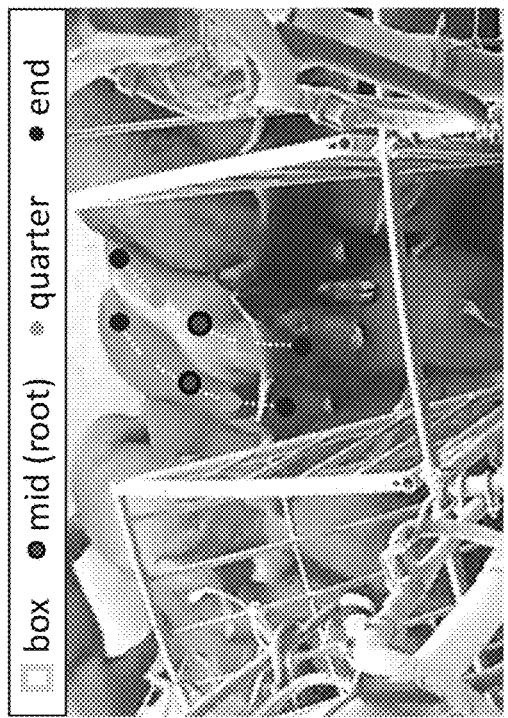
FIG. 10B and FIG. 10D schematically show a method of bottom-up detection of pigs according to certain embodiments of the present disclosure.
Figure 10C:
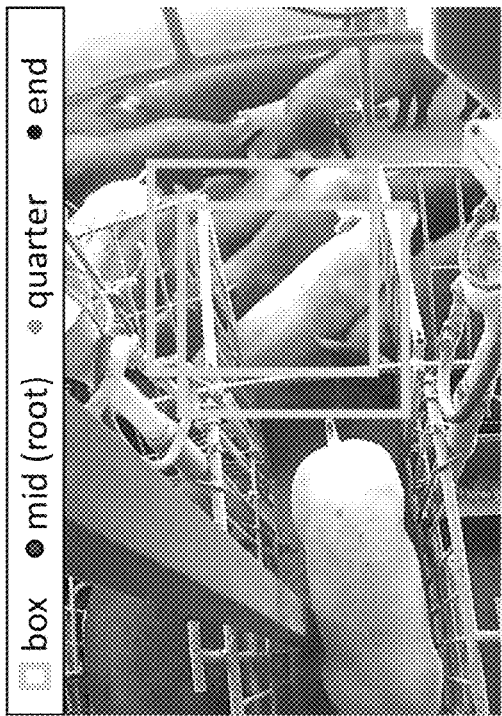
Figure 10D:
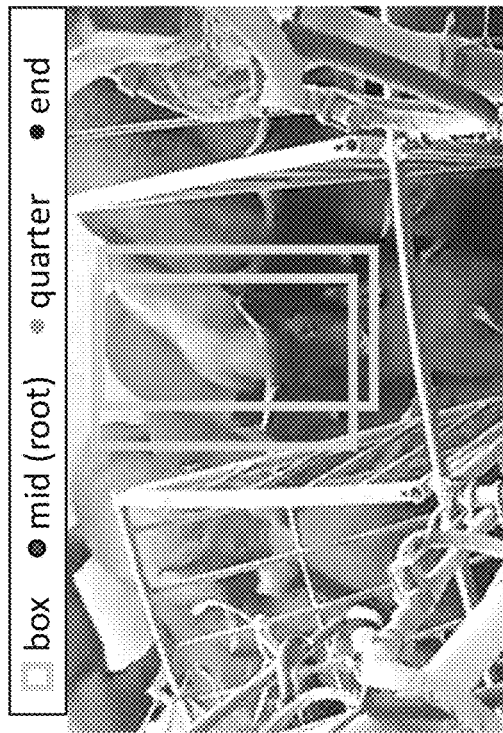

In certain aspects, the present disclosure may also be implemented by replacing the bottom up pig detection using a top-down method. In the embodiments, the disclosure uses detectors, such as single shot detector (SSD), you only look once (YOLO) or faster region-based convolutional neural network (Faster-RCNN) to detect bounding boxes. However, these methods are not so accurate or efficient as the embodiments described above. These methods first propose locations of detection candidates using bounding boxes, and then classified each box to be the real target or not. In certain embodiments, non-maximum suppression (NMS) are employed as a post-processing method to significantly reduce false positive candidates by removing the bounding boxes that have high overlap ratios (intersection over union) with each other. Nonetheless, using bounding boxes to localize the pigs is sub-optimal in this application. The deformable long oval pig shapes are very challenging for bounding-box-based approaches in crowded scene. As shown in FIG. 10A and FIG. 10C, the bounding boxes around two adjacent pigs have very high overlap ratio, whose ambiguous nature tends to confuse the neural network training. Moreover, for inference, the NMS post-processing step would enforce the detector to only select one bounding box for these high overlapping cases, resulting in false negatives. Compared with bounding boxes, the pig skeletons defined by keypoints are more suitable for differentiating pigs in the crowd as shown in FIG. 10B and FIG. 10D.

In certain embodiments, the system may not need to install a rail 190, and the robotic device 110 and the imaging device 170 may be installed on a drone. The drone may fly in a pig house from one end to the other such that the imaging device 170 may take video images of the pig house, and the robotic device 110 may process the captured video images to obtain a count of the pigs in the pig house.

In certain embodiments, instead of moving the imaging device 170 from one end to the other end of the house, the system may install multiple imaging device at different areas, such that the images captured by the multiple imaging device cover the whole pig house. However, due to the difficulty and computing resource in integrating the captured images, the fixed multiple imaging devices may not be as good as using the movable imaging device 170.

Certain embodiments of the present disclosure, among other things, have the following beneficial advantages. First, counting of the pigs are automatic based on captured video images, thus saves the cost of pig counting by other methods. Second, the detection of the pigs in the captured video frames does not need to detect bounding boxes, which avoids the situations that a bounding box may cover more than one pig due to the crowdedness in the pig house. Instead, the disclosure provides a bottom-up solution, where keypoints are detected directly, and the skeleton of a pig is deduced from the grouping of the keypoints. Third, the grouping of the keypoints considers the flexibility of the pig bodies and the fast moving of the pigs in the pig house. Specifically, the disclosure considers both the distances and the vector directions between the keypoints to group the keypoints as belonging to a pig, which makes the determination of the pigs more accurate. Fourth, each video frame is divided into an activated zone and a deactivated zone, each pig skeleton location in the trajectories of the pigs is designated with a spatial code value based on the zones the skeleton belongs to, and the spatial code values for each trajectory are summed by first order difference to get an accurate count. Therefore, the moving of a pig from one zone to the other or moving out of the zones does not affect accurate counting, and a fast-moving pig from one area to the other will not be counted multiple times. Further, even if a pig is missing in several intermediate frames, and the trajectory of the same pig is regarded as several separate trajectories belonging to different pigs, the above counting can still capture the situation and provide an accurate counting as 0 or 1 for the several trajectories.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

REFERENCES

[1] TIAN MENGXIAO, HAO GUO, HONG CHEN, et al., Automated pig counting using deep learning, Computers and Electronics in Agriculture, 2019, 163, 0168-1699.
[2] XU LIU, STEVEN W. CHEN, SHREYAS ADITYA, et al, Robust fruit counting: combining deep learning, tracking, and structure from motion, 2018 IEEE/RSJ International Conference on Intelligent Robots and Systems (IROS), 2018, arXiv: 1804.00307.
[3] XU LIU, STEVEN W CHEN, CHENHAO LIU, et al., Monocular camera based fruit counting and mapping with semantic data association, IEEE Robotics and Automation Letters, 2019, 4(3): 2296-2303.
[4] JARROD C HODGSON, SHANE M BAYLIS, ROWAN MOTT, et al., Precision wildlife monitoring using unmanned aerial vehicles, Scientific reports, 2016, 6: 22574.
[5] RIVAS A, CHAMOSO P, GONZALEZ-BRIONES A, CORCHADO J M, Detection of cattle using drones and convolutional neural networks, Sensors, 2018, 18(7): 2048.
[6] ANDREW G HOWARD, MENGLONG ZHU, BO CHEN, et al., Mobilenets: efficient convolutional neural networks for mobile vision applications, 2017, arXiv: 1704.04861.
[7] VIJAY BADRINARAYANAN, ALEX KENDALL, ROBERTO CIPOLLA, SegNet: a deep convolutional encoder-decoder architecture for image segmentation, IEEE transactions on pattern analysis and machine intelligence, 2017, 39(12): 2481-95.
[8] WEI LIU, DRAGOMIR ANGUELOVE, DUMITRU ERHAN, et al, SSD: single shot multibox detector, European conference on computer vision, 2016, 21-37, Springer, Cham, arXiv: 1512.02325.
[9] JOSEPH REDMON, SANTOSH DIVVALA, ROSS GIRSHICK, ALI FARHADI, You only look once: unified, real-time object detection, Proceedings of the IEEE conference on computer vision and pattern recognition, 2016, 779-788.
[10] ROSS GIRSHICK, Fast R-CNN, Proceedings of the IEEE international conference on computer vision, 2015, 1440-1448.

What is claimed is:

1. A system for counting animals in a house, the system comprising a computing device and an imaging device, the computing device comprising a processor and a storage device storing computer executable code, wherein the computer executable code, when executed at the processor, is configured to:

receive a plurality of images captured by the imaging device from one end of the house toward an opposite, other end of the house;

detect keypoints in each of the images using a neural network;

identify skeletons of the animals by associating a plurality of the keypoints in the images, each skeleton corresponds to one of the animals;

track the identified skeletons in the images to obtain trajectories of the skeletons;

divide each of the images into an activated zone and a deactivated zone;

designate first spatial values for the skeletons in the activated zone and second spatial values for the skeletons in the deactivated zone;

provide a trajectory count for each of the trajectories by summating first order difference of the first and second spatial values of corresponding one of the skeletons in corresponding one of the trajectories; and add the trajectory counts of the trajectories to obtain a count of the animals.

2. The system of claim 1, wherein:

each of the skeletons comprises at least one of five types of keypoints, the five types of keypoints comprise a head keypoint corresponding to head of the animal, a neck keypoint corresponding to neck of the animal, a back keypoint corresponding to back of the animal, a waist keypoint corresponding to waist of the animal, and a tail keypoint corresponding to tail of the animal; and each of the detected keypoints comprises a classification indicating which of the five type of keypoints the detected keypoint belongs to and a vector indicating a direction toward at least one of the detected keypoints that belongs to a same skeleton as the detected keypoint.

3. The system of claim 1, wherein the first spatial value is 0 and the second spatial value is 1.

4. The system of claim 1, wherein size of the activated zone and size of the deactivated zone are equal, and the activated zone is in front of the deactivated zone along moving direction of the imaging device.

5. The system of claim 1, wherein the computer executable code is further configured to: filter out skeletons close to an activity scanning line separating the activated zone and the deactivated zone.

6. The system of claim 1, wherein the computer executable code is configured to track the identified skeletons in the images by bipartite graph matching.

7. The system of claim 1, wherein the neural network is a convolutional neural network (CNN) and the animals are pigs.

8. The system of claim 1, wherein the imaging device is installed on a guide rail above the house from the one end to the other end of the house.

9. The system of claim 8, wherein the neural network is trained in a remote computing device, and the computing device is movable with the imaging device and is an embedded device.

10. The system of claim 1, wherein the computing device and the imaging device are installed on a drone.

11. A method for counting animals in a house, comprising:

receiving, by a computing device, a plurality of images captured by an imaging device from one end of the house toward an opposite, other end of the house;

detecting, by the computing device, keypoints in each of the images using a neural network;

identifying, by the computing device, skeletons of the animals by associating a plurality of the keypoints in the images, each skeleton corresponds to one of the animals;

tracking, by the computing device, the identified skeletons in the images to obtain trajectories of the skeletons;

dividing, by the computing device, each of the images into an activated zone and a deactivated zone;

designating, by the computing device, first spatial values for the skeletons in the activated zone and second spatial values for the skeletons in the deactivated zone;

providing, by the computing device, a trajectory count for each of the trajectories by summating first order difference of the first and second spatial values of corresponding one of the skeletons in corresponding one of the trajectories; and adding, by the computing device, the trajectory counts of the trajectories to obtain a count of the animals.

12. The method of claim 11, wherein:

each of the skeletons comprises at least one of five types of keypoints, the five types of keypoints comprise a head keypoint corresponding to head of the animal, a neck keypoint corresponding to neck of the animal, a back keypoint corresponding to back of the animal, a waist keypoint corresponding to waist of the animal, and a tail keypoint corresponding to tail of the animal; and each of the detected keypoints comprises a classification indicating which of the five type of keypoints the detected keypoint belongs to and a vector indicating a direction toward at least one of the detected keypoints that belongs to a same skeleton as the detected keypoint.

13. The method of claim 11, wherein the first spatial value is 0 and the second spatial value is 1.

14. The method of claim 11, wherein size of the activated zone and size of the deactivated zone are equal, and the activated zone is in front of the deactivated zone along moving direction of the imaging device.

15. The method of claim 11, further comprising: filtering out, by the computing device, skeletons close to an activity scanning line separating the activated zone and the deactivated zone.

16. The method of claim 11, wherein the step of tracking the identified skeletons in the images is performed by bipartite graph matching.

17. The method of claim 11, wherein the neural network is a convolutional neural network (CNN), and the animals are pigs.

18. The method of claim 11, wherein the imaging device is installed on a guide rail above the house from the one end to the other end of the house, the neural network is trained in a remote computing device, and the computing device is movable with the imaging device and is an embedded device.

19. A non-transitory computer readable medium storing computer executable code, wherein the computer executable code, when executed at a processor of a computing device, is configured to:

receive a plurality of images captured by an imaging device from one end of the house toward an opposite, other end of the house;

detect keypoints in each of the images using a neural network;

identify skeletons of the animals by associating a plurality of the keypoints in the images, each skeleton corresponds to one of the animals;

track the identified skeletons in the images to obtain trajectories of the skeletons;

divide each of the images into an activated zone and a deactivated zone;

designate first spatial values for the skeletons in the activated zone and second spatial values for the skeletons in the deactivated zone;

provide a trajectory count for each of the trajectories by summating first order difference of the first and second spatial values of corresponding one of the skeletons in corresponding one of the trajectories; and add the trajectory counts of the trajectories to obtain a count of the animals.

20. The non-transitory computer readable medium of claim 19, wherein:

each of the skeletons comprises at least one of five types of keypoints, the five types of keypoints comprise a head keypoint corresponding to head of the animal, a neck keypoint corresponding to neck of the animal, a back keypoint corresponding to back of the animal, a waist keypoint corresponding to waist of the animal, and a tail keypoint corresponding to tail of the animal;

each of the detected keypoints comprises a classification indicating which of the five type of keypoints the detected keypoint belongs to and a vector indicating a direction toward at least one of the detected keypoints that belongs to a same skeleton as the detected keypoint; and wherein the first spatial value is 0 and the second spatial value is 1.

* * * * *